(12) United States Patent
Seffernick et al.

(10) Patent No.: US 6,805,213 B2
(45) Date of Patent: Oct. 19, 2004

(54) VEHICLE ACCESS PORT COVER

(75) Inventors: Daniel R. Seffernick, Fort Wayne, IN (US); Jesus D. Viduya, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 50 days.

(21) Appl. No.: 10/195,293

(22) Filed: Jul. 15, 2002

(65) Prior Publication Data

US 2004/0007408 A1 Jan. 15, 2004

(51) Int. Cl.[7] .............................................. B60K 11/04
(52) U.S. Cl. .................................. 180/68.6; 296/193.1
(58) Field of Search ............................ 180/68.6, 69.24, 180/68.4, 89.13, 89.17, 68.1, 68.2, 68.3; 296/193.1, 1.08; 293/115

(56) References Cited

U.S. PATENT DOCUMENTS

| | | | | |
|---|---|---|---|---|
| 1,841,675 A | * | 1/1932 | Rood | 180/68.6 |
| 2,870,833 A | * | 1/1959 | Posnansky | 160/181 |
| 3,831,696 A | * | 8/1974 | Mittendorf et al. | 180/68.6 |
| 4,093,119 A | * | 6/1978 | Swisher | 237/12.3 A |
| 4,178,034 A | * | 12/1979 | Mittendorf | 296/91 |
| 4,842,319 A | * | 6/1989 | Ziegler et al. | 296/91 |
| 6,206,438 B1 | * | 3/2001 | Pueyo | 293/115 |

FOREIGN PATENT DOCUMENTS

| | | | |
|---|---|---|---|
| DE | 3522592 | * | 1/1987 |
| DE | 3145506 | * | 5/1989 |
| EP | 41275 | * | 12/1981 |

* cited by examiner

Primary Examiner—Bryan Fischmann
(74) Attorney, Agent, or Firm—Jeffrey P. Calfa; Dennis Kelly Sullivan; Susan L. Lukasik

(57) ABSTRACT

A motor vehicle incorporates a novel grille which provides a port giving access to the cooling system surge tank. The port is closed by a cover which is removable and replaceable without the use of tools. The cover can carry on an outside face a badge or medallion of the manufacturer. While the cover is removable from the frame in the grille, theft is discouraged by a cord connected between the cover and the vehicle itself. Cutting or breaking the cord does not result in damage to the grille.

14 Claims, 6 Drawing Sheets

VEHICLE ACCESS PORT COVER

BACKGROUND OF THE INVENTION

1. Field of the Invention

The present invention relates to motor vehicles and more particularly relates to providing a service access port through the exterior skin of the vehicle to components of the vehicle for inspection and service.

2. Description of the Problem

Cab over engine trucks and busses emphasize compactness in packaging at the cost of greater difficulty in accessing engine related components. Some of these components should be readily accessible for inspection and, if required, the addition of fluids to insure optimal operation and life of the engine. One such component is the coolant system surge tank.

Access to the coolant system surge tank being important, truck manufacturers have equipped vehicles with small hinged access doors on the front of vehicles, typically above the radiator grille. These doors have proven prone to damage in the field and expensive to repair.

Another issue for truck manufacturers and owners, seemingly unrelated to the problem of engine access, concerns the frequent theft of manufacturer badges and logos from vehicles. A popular location for such badges is the vehicle grille, and it is here that manufacturers prefer for positioning the heavier, cast badges which are particularly popular with thieves. Truck manufacturers, with understandable pride, and truck owners, some of whom have considerable brand loyalty, place particular value on these badges and the touch of class they add to the vehicles.

Unfortunately, traditional methods of attaching the badges to the grille leave the grille vulnerable to damage should the badge be removed in the quick and dirty manner favored by thieves. Owners then face an even greater expense for repairing the grille as well as the expense for replacing the badge.

SUMMARY OF THE INVENTION

What is desired then is to provide an unobtrusive, but practical access port through the front of a cab over engine vehicle to a radiator surge tank.

It is further desired that vehicle grille badges be attached to the vehicle in a manner which both discourages theft and avoids damage to the grille if the badge is forcibly removed.

According to the invention there is provided a radiator grille mounted to a vehicle. The grille defines a frame forming the perimeter of an access port through the grille. A cover for the access port fits within and is removably supported from the frame. Three releasable points of attachment between the cover and the frame are provided. The points of attachment are arranged so that inward pressure along one edge or at one corner of the cover serves to detach the cover from the points of attachment. A cord is attached between the cover and the vehicle to discourage casual theft.

The three releasable points of attachment comprise first and second releasable points of attachment formed by a pivot rod attached across a back surface of the cover and two spaced clips positioned in the frame and open toward the outside of the vehicle to capture the rod when the cover is inserted into the frame in a preferred orientation. Set in the clips, the rod defines a first axis of rotation for the cover in the frame. The third releasable point of attachment also comprises a rod section attached to the back surface of the cover, but spaced from and perpendicular to the pivot rod. Yet another clip is positioned with respect to the frame, open toward the outside, to capture the rod section when the cover is introduced to the frame in the preferred orientation. The rod and rod section are removable from the clips by generating a force outwardly from the frame.

The arrangement of the clips, and a secondary pivot, provides the means for generating the required extractive force from inward pressure along one edge or corner of the cover. Pressure along an edge of the outside surface of the cover on the side of the cover opposed to the rod section causes the cover to pivot on the rod positioned in the first two clips, extracting the rod section from its associated clip. Arranged in the frame on the opposite side of the rod from the rod section when the cover is fitted into the frame are two pegs which, as the cover is further depressed, are contacted by the cover providing a second pivot spaced from the first pivot. A responsive force is applied to the cover from the pegs to force the rod from the first two clips. The cover is readily repositioned in the frame by introducing it the frame on a level posture with the frame.

The cover further comprises a badge on its outside face.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
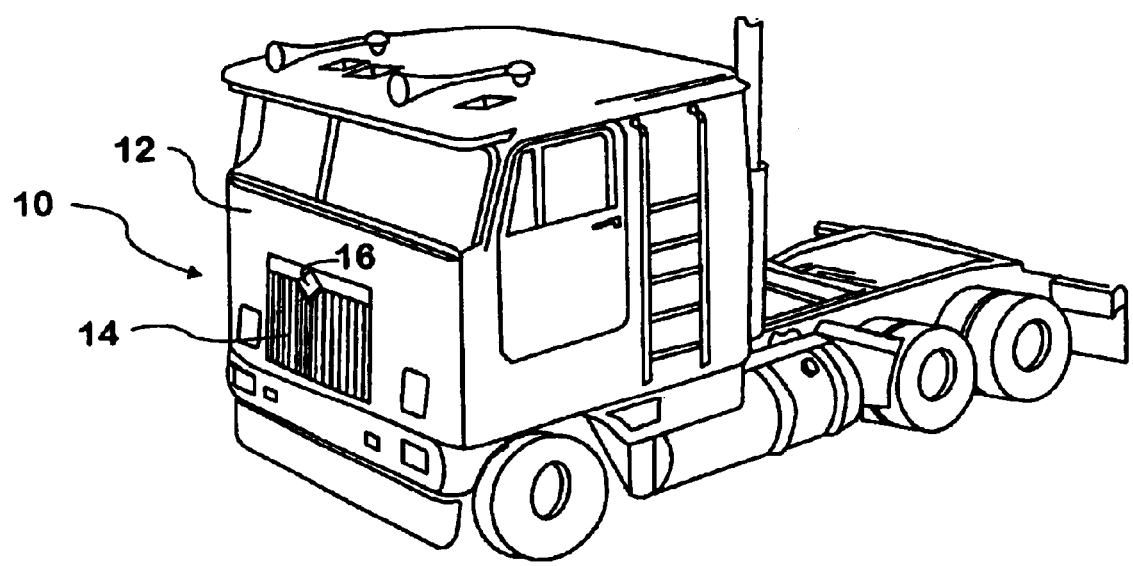
FIG. 1 is a perspective view of a cab over engine truck with which the present invention is advantageously utilized.
Figure 2:
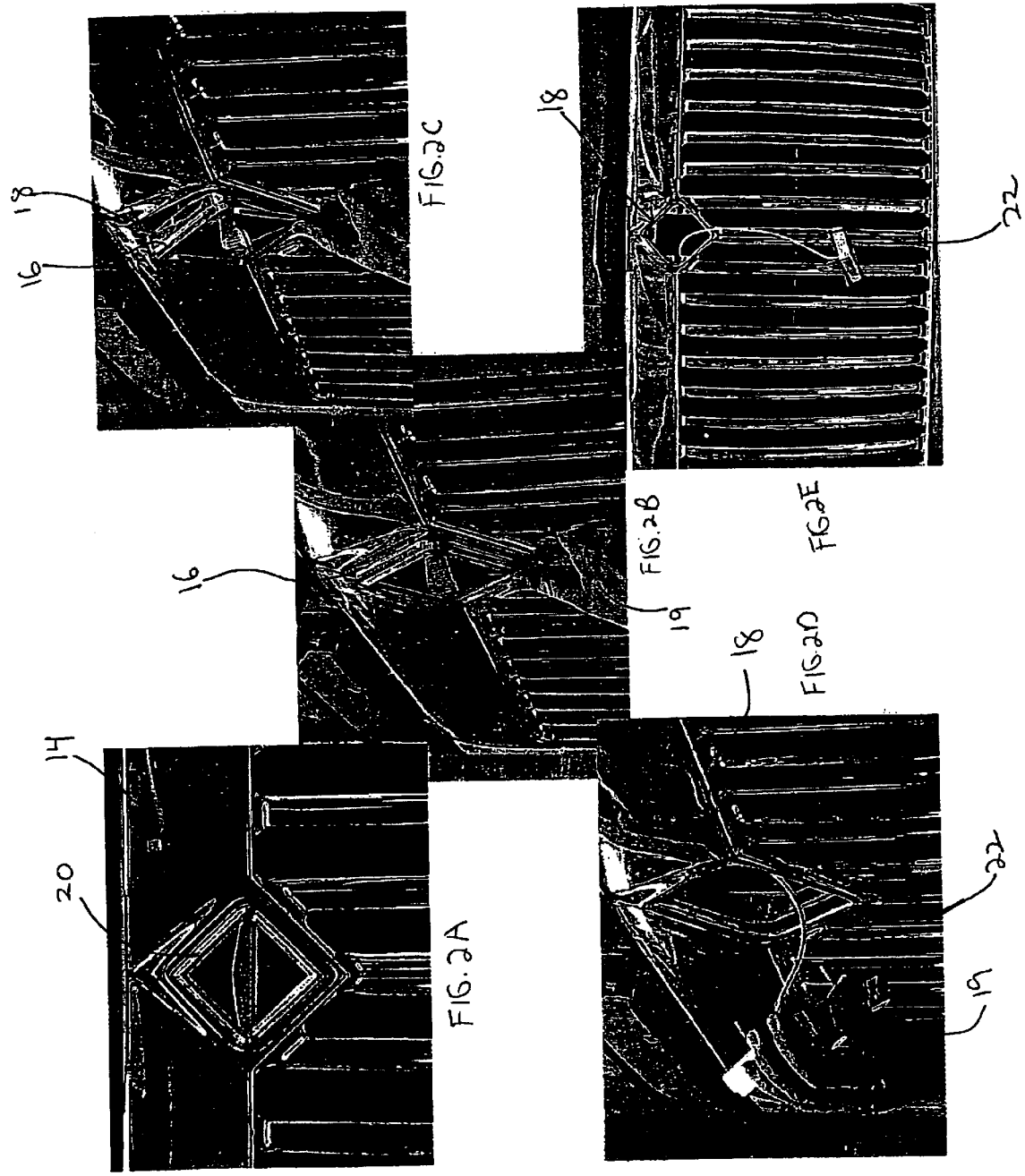
FIGS. 2A–E are are series of perspective views illustrating operation of the present invention.

Referring to FIG. 1, a truck 10 incorporates a radiator grille 14 which provides a port giving access to the cooling system surge tank. Grille 14 provides a portion of the exterior skin 12 of truck 10, protecting the components of the vehicle and streamlining the vehicle to reduce wind resistance. The port is closed by a cover 16 which may be removed from and repositioned in grill 14 without the use of tools. Cover 16 can carry a badge or medallion of the manufacturer on its outside face. While cover 16 is removable from the grille 14, theft is discouraged by a cord connected between the cover and the vehicle itself. Cutting or breaking the cord does not result in damage to the grille 16.

FIGS. 2A–E illustrate operation of the cover 16 to gain access to a surge tank through an access port 18. Those skilled in the art will realize now that a port such as disclosed herein could be used to provide points of access to various sections of the vehicle for service and storage and that its use to provide access to a coolant surge tank, while the preferred application, is used by way of example. Cover 16 carries a manufacturer logo or emblem 20 disguising the location of the access port, which improves the appearance of the vehicle.

Cover 16 is temporarily removed from port 18 by a user 19 depressing cover 16 at one corner, or along one edge at the bottom thereof, resulting in the cover rotating outwardly at its top. As the cover 16 rotates outwardly connection to clips holding the cover in place is progressively broken allowing the cover to be grasped and withdrawn from port 18. In the final view cover 16 hangs from a cord 22 which is attached between the cover and a point inside the vehicle.

Figure 3:
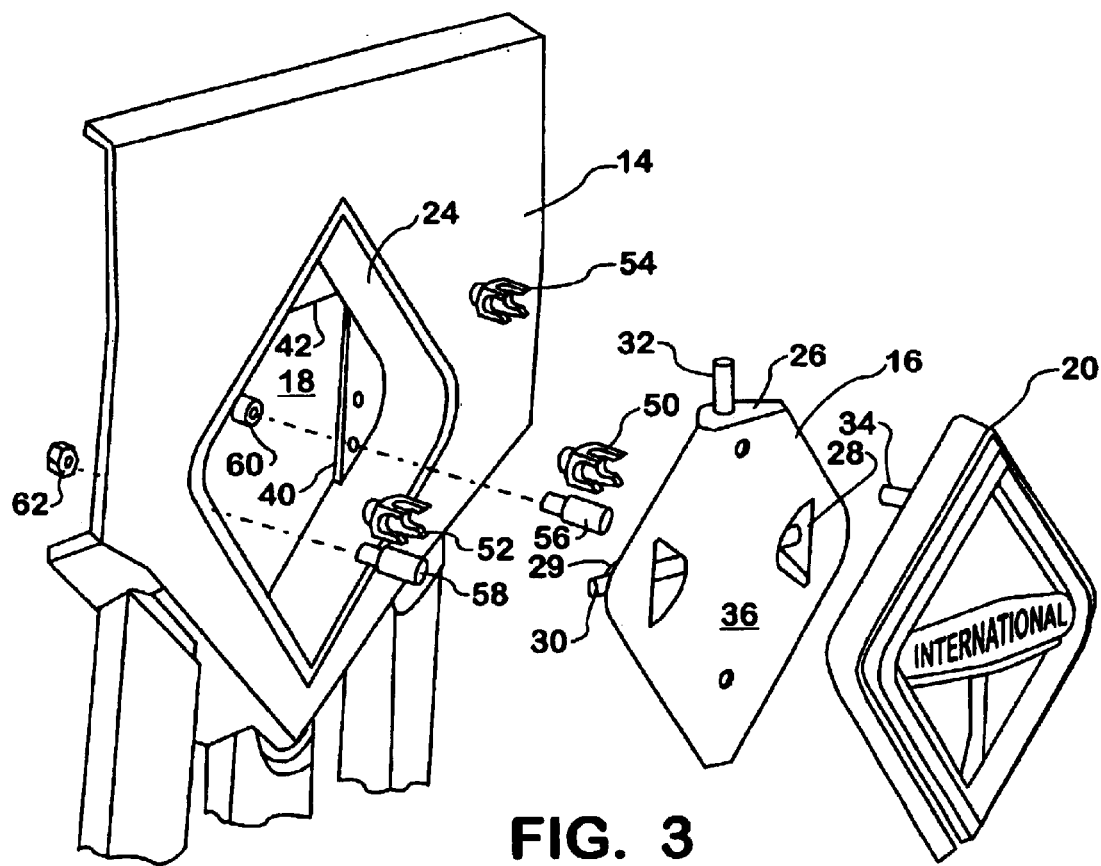
FIG. 3 is an exploded perspective view of the preferred embodiment of the invention.

FIG. 3 illustrates construction of the cover 16 and cooperating elements arranged in a frame 24 formed in grille 14. Cover 16 is adapted to carry a badge or logo 20 mounted to an outer side 36 of cover 16 using pegs 34 or other structures or adhesives applied to a back side of logo 20.

Cover 16 itself is a substantially flat member, shaped and sized to fit within frame 24 to close access port 18. In the assignee's application of the invention, cover 16 has a diamond shape, but the invention can be readily applied to round and rectangular shapes, among others. A top corner of cover 16 has been turned down to form a flange 26 which lies substantially perpendicular to the cover. Two additional opposing flanges 28 and 29 are provided centered in the cover 16 between the top corner and the bottom corner.

Flange 26 provides a support for a vertically oriented section of rod section 32 which provides part of the attachment mechanism for cover 16 to frame 24. The set of flanges 28 and 29 provides a support brace for a rod 30, which is positioned below rod section 32 and perpendicular thereto. Rod section 32 and rod 30 cooperate with clips mounted in frame 24 as discussed below to provide for attaching cover 16 to grille 14 in frame 24, when the cover is properly oriented.

Frame 24 is formed into the body of grille 14 and forms the perimeter of an access port 18 through the grille to the interior of the vehicle. Extending inwardly from the perimeter formed by frame 24 are three flanges located inwardly from the left, right and top corners of the frame (with flange 40 of the left corner being visible and flange 42 in the top corner being partly visible). The flanges, including flanges 40 and 42, provide platforms for the attachment of clips 50, 52 and 54, one to each flange. Clips 50, 52 and 54 are made of a resilient plastic and are open in the forward direction toward the front of grille 14 to allow insertion and capture of a rod pressed into the clip. Clips 50 and 52 are located level with and aligned on one another, the openings oriented to allow a single rod, here rod 30 to be captured by the clips simultaneously adjacent each end of the rod. Rod 30 can than rotate in clips 50 and 52. Clip 54 is located above clips 50 and 52, supported on flange 42. Clip 54 is oriented to capture a rod which is in turn oriented at a right angle to rod 30, here rod section 32.

Below clips 50 and 52, on the same respective flanges, are two pegs 56 and 58, each of which has a mounting stem which passes through a hole in the flanges for attachment to a locking nut 60 or 62. The main bodies of pegs 56 and 58 do not extend as far forward as the central axis of rod 30 when it is captured in clips 50 and 52. Thus when cover 16 is depressed inwardly at the bottom into access port 18, the body of cover 16 first rotates on rod 30, pulling rod section 32 from clip 54. As the bottom of cover 16 is pushed further in, it impinges against pegs 56 and 58, which define a new pivot axis for the cover which is spaced from but parallel to rod 30. Further depression of the bottom of cover 16 pushes rod 30 out of engagement with clips 50 and 52.

Figure 4:
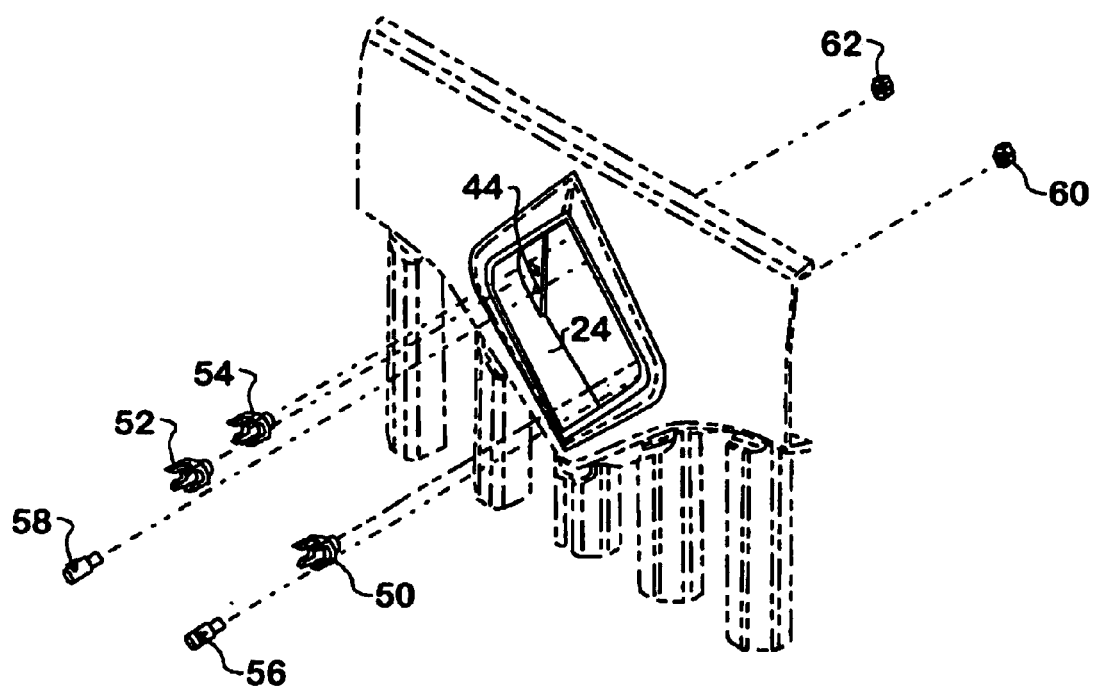
FIG. 4 is a perspective view illustrating details of a frame set in a grille.

FIG. 4 further illustrates the arrangement of clips and pegs in frame 24, and shows the right side flange 44 in the right corner of frame 24. The perpendicular orientation of clip 54 relative to the clips 50 and 52 is also shown.

Figure 5:
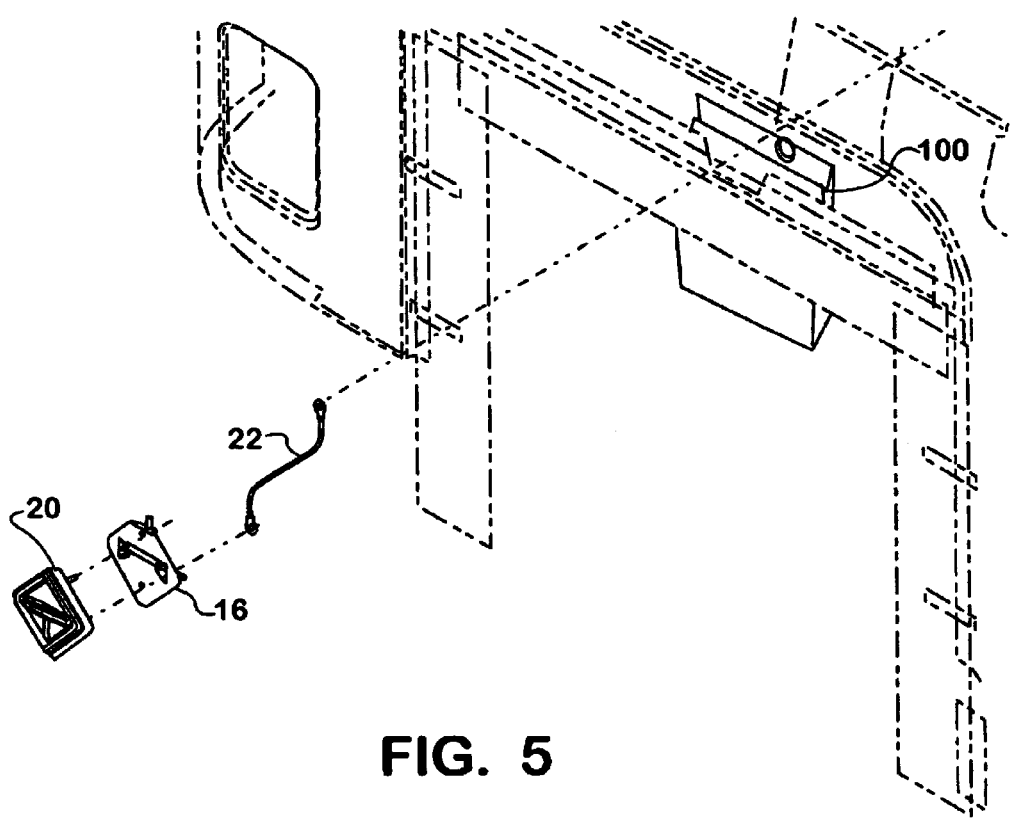
FIG. 5 is a perspective view illustrating the invention in greater detail.
Figure 6:
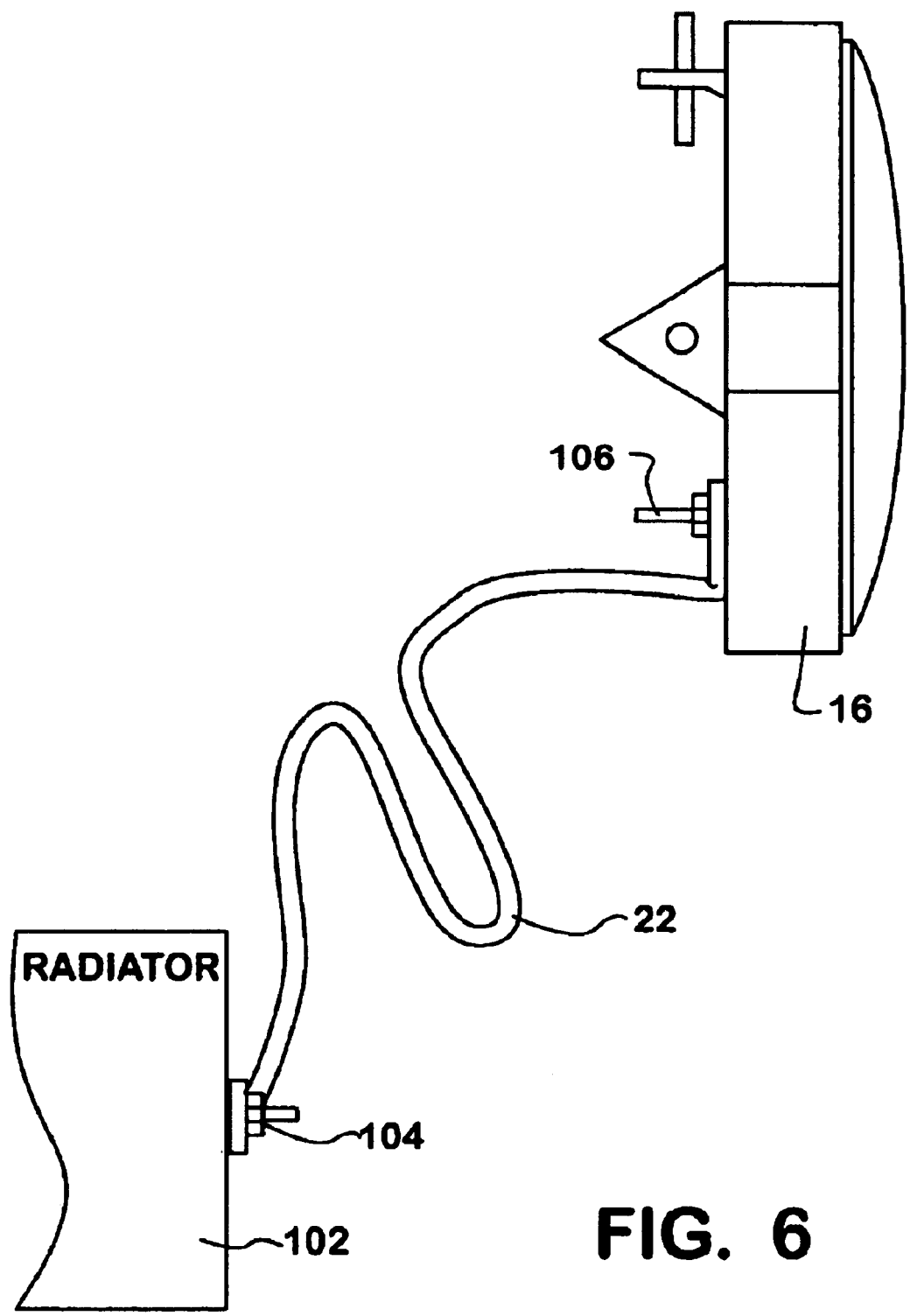
FIG. 6 is side elevation of the invention.

FIG. 5 illustrates a wire reinforced retention cord 22 for attachment between cover 16 and the vehicle. The figure further shows location of a coolant system surge tank 100 just inside the exterior skin of the vehicle. FIG. 6 illustrates cord 22, which is bolted to or screwed down on cover 16 and the radiator or other vehicle component 102 using fasteners 104 and 106, respectively.

The present invention provides an unobtrusive, but practical access port through the front of a cab over engine vehicle to a radiator surge tank. The port cover is readily combined with a vehicle grille medallions which is attached to the grille in a manner which both discourages theft and avoids damage to the grille even if forcibly removed.

While the invention is shown in only one of its forms, it is not thus limited but is susceptible to various changes and modifications without departing from the spirit and scope of the invention.

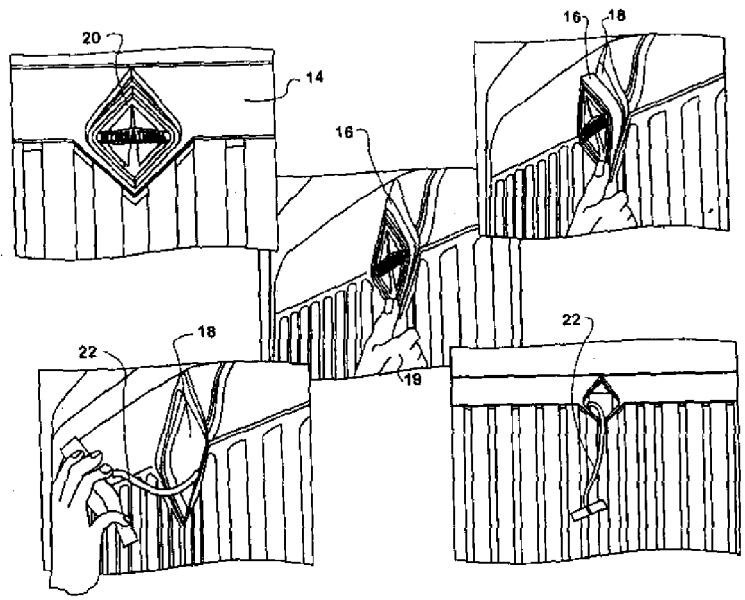

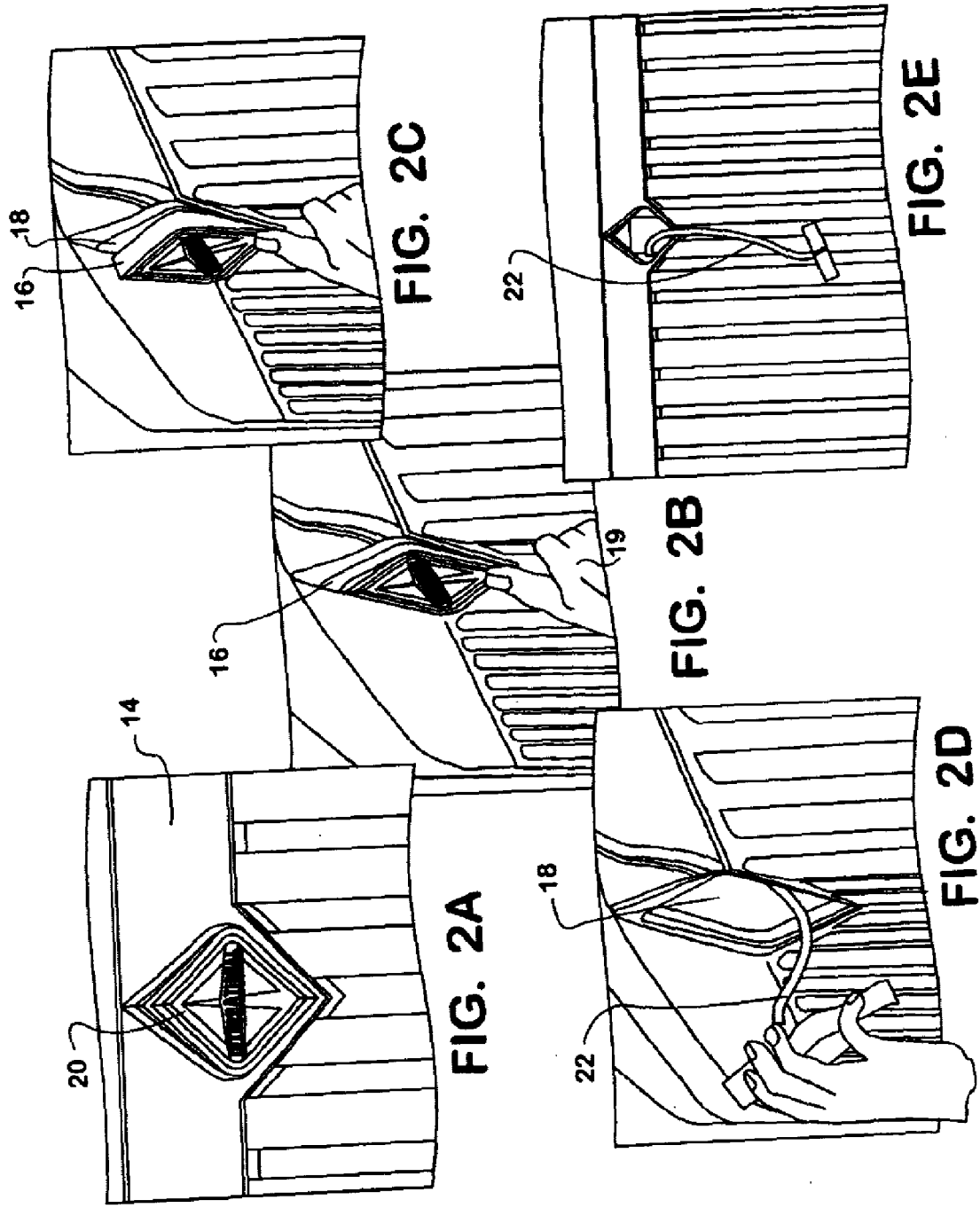

What is claimed is:

1. A radiator grille mounted to a vehicle, comprising:

a planar member;

a frame in the planar member defining an access opening through the planar member;

a cover for the access opening fitting within and removably supported in the frame;

first, second and third releasable points of attachment between the cover and the frame, the first and second releasable points of attachment defining a first axis of rotation for the cover allowing pressure applied against the cover to one side of the first axis to result in rotation of the cover and urging release of the cover from the third point of attachment; and a cord attached between the cover and the vehicle.

2. A radiator grille as set forth in claim 1, the three releasable points of attachment further comprising:

the first and second releasable points of attachment formed by a pivot rod attached across a back surface of the cover and two spaced clips positioned with respect to the frame to capture the pivot rod when the cover is inserted into the frame in a preferred orientation, the clips defining a first axis of rotation for the cover in the frame coincident with the pivot rod; and the third releasable point of attachment comprising a rod section attached to the back surface of the cover which is spaced from and perpendicular to the pivot rod, and a clip positioned with respect to the frame to capture the rod section when the cover is introduced to the frame in the preferred orientation.

3. A radiator grille as set forth in claim 2, further comprising:

a pair of pegs positioned with respect to the frame in line parallel to the two spaced clips of the first and second mounting points to define a second axis of rotation of the cover spaced from and parallel to the first axis of rotation.

4. A radiator grille as claimed in claim 2, the cover further comprising a badge on an outside face opposite the pivot rod and rod section.

5. A cab over engine vehicle comprising:

a radiator grille;

a surge tank located behind the radiator grille;

a frame within the radiator grille defining an access port from outside the vehicle through the access port to the surge tank;

a cover for the access port which fits within and is removable from the frame; and a cord attached between the cover and the vehicle.

6. A cab over engine vehicle as set forth in claim 5, further comprising:

first, second and third points of attachment between the cover and the frame, each of the points of attachment comprising a rod and a clip.

7. A cab over engine vehicle as set forth in claim 6, further comprising:

for each point of attachment the clip being positioned with respect to the frame and the rod being attached to a back surface of the cover.

8. A cab over engine vehicle as set forth in claim 7, wherein the first and second points of attachment further comprise the clips being aligned to engage a shared rod at opposite ends thereof when the cover is introduced to the frame in a preferred orientation.

9. A cab over engine vehicle as set forth in claim 8, the cover having a badge on a front side.

10. A vehicle, comprising:

a vehicle exterior;

a serviceable component within the vehicle;

a frame in the vehicle exterior defining a service port through the exterior adjacent the serviceable component;

a removable cover fitable to the frame;

means for securing the removable cover in the frame allowing the cover to be detached from the vehicle by progressively displacing the cover inwardly on the vehicle along one edge or corner of the cover; and a cable attached between the removable cover and the vehicle for securing the cover to the vehicle.

11. A vehicle as set forth in claim 10, means for securing further comprising:

a first rod disposed across a back surface of the cover;

a pair of clips mounted with respect to the frame to engage the first rod adjacent opposite ends thereof upon introduction of the cover to the frame in a preferred orientation;

a second rod positioned on a back surface of the cover spaced from one side of and perpendicular to the first rod; and a clip mounted with respect to the frame to engage the second rod when the cover is introduced to the frame in the preferred orientation.

12. A vehicle as set forth in claim 11, further comprising:

a secondary pivot located on the frame to be positioned on the opposite side of the first rod from the second rod when the cover is fitted to the frame.

13. A vehicle as set forth in claim 12, further comprising:

a radiator grille forming a portion of the vehicle exterior with the frame being formed into the radiator grille.

14. A vehicle as set forth in claim 13, further comprising:

a front surface of the cover bearing an insignia.

* * * * *

UNITED STATES PATENT AND TRADEMARK OFFICE
CERTIFICATE OF CORRECTION

PATENT NO.    : 6,805,213 B2
DATED         : October 19, 2004
INVENTOR(S)   : Seffernick et al.

It is certified that error appears in the above-identified patent and that said Letters Patent is hereby corrected as shown below:

The title page, showing illustrative figure, should be deleted and substitute therefore the attached title page.

Delete Figures 2A-2E and substitute therefore the drawing sheets, consisting of Figures 2A-2E shown on the attached pages.

Signed and Sealed this

Nineteenth Day of April, 2005

JON W. DUDAS
*Director of the United States Patent and Trademark Office*

(12) United States Patent
Seffernick et al.

(10) Patent No.: US 6,805,213 B2
(45) Date of Patent: Oct. 19, 2004

(54) VEHICLE ACCESS PORT COVER

(75) Inventors: Daniel R. Seffernick, Fort Wayne, IN (US); Jesus D. Viduya, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 50 days.

(21) Appl. No.: 10/195,293

(22) Filed: Jul. 15, 2002

(65) Prior Publication Data
US 2004/0007408 A1 Jan. 15, 2004

(51) Int. Cl.$^7$ ............................................. B60K 11/04
(52) U.S. Cl. ............................. 180/68.6; 296/193.1
(58) Field of Search ..................... 180/68.6, 69.24, 180/68.4, 89.13, 89.17, 68.1, 68.2, 68.3; 296/193.1, 1.08; 293/115

(56) References Cited

U.S. PATENT DOCUMENTS

| | | | | |
|---|---|---|---|---|
| 1,841,675 A | * | 1/1932 | Rood | 180/68.6 |
| 2,870,833 A | * | 1/1959 | Posnansky | 160/181 |
| 3,831,696 A | * | 8/1974 | Mittendorf et al. | 180/68.6 |
| 4,093,119 A | * | 6/1978 | Swisher | 237/12.3 A |
| 4,178,034 A | * | 12/1979 | Mittendorf | 296/91 |
| 4,842,319 A | * | 6/1989 | Ziegler et al. | 296/91 |
| 6,206,438 B1 | * | 3/2001 | Pueyo | 293/115 |

FOREIGN PATENT DOCUMENTS

| | | | |
|---|---|---|---|
| DE | 3522592 | * | 1/1987 |
| DE | 3145506 | * | 5/1989 |
| EP | 41275 | * | 12/1981 |

* cited by examiner

*Primary Examiner*—Bryan Fischmann
(74) *Attorney, Agent, or Firm*—Jeffrey P. Calfa; Dennis Kelly Sullivan; Susan L. Lukasik

(57) ABSTRACT

A motor vehicle incorporates a novel grille which provides a port giving access to the cooling system surge tank. The port is closed by a cover which is removable and replaceable without the use of tools. The cover can carry on an outside face a badge or medallion of the manufacturer. While the cover is removable from the frame in the grille, theft is discouraged by a cord connected between the cover and the vehicle itself. Cutting or breaking the cord does not result in damage to the grille.

14 Claims, 6 Drawing Sheets